United States Patent [19]
Kneisel et al.

[11] Patent Number: 4,584,709
[45] Date of Patent: Apr. 22, 1986

[54] HOMOTROPIC ANTENNA SYSTEM FOR PORTABLE RADIO

[75] Inventors: Thomas F. Kneisel, Davie; Quirino Balzano, Plantation, both of Fla.; Thomas A. Freeburg, Arlington Heights, Ill.

[73] Assignee: Motorola, Inc., Schaumburg, Ill.

[21] Appl. No.: 511,430

[22] Filed: Jul. 6, 1983

[51] Int. Cl.⁴ ........................... H04B 1/44; H04B 7/08
[52] U.S. Cl. ....................................... 455/78; 343/702; 375/100; 455/89; 455/277; 455/351
[58] Field of Search ................. 455/52, 65, 73, 78–81, 455/89, 90, 133–135, 277, 347, 351; 375/40, 100; 343/815, 818, 819, 826, 827, 832, 834, 845, 702, 893, 725, 844

[56] References Cited

U.S. PATENT DOCUMENTS

| | | | |
|---|---|---|---|
| 2,266,630 | 12/1941 | Forbes | 343/702 |
| 2,810,906 | 10/1957 | Lynch | 343/818 |
| 2,872,568 | 2/1959 | Provaz | 455/277 |
| 3,037,114 | 5/1962 | Bier et al. | 455/277 |
| 3,987,448 | 10/1976 | Scheppman | 343/702 |

Primary Examiner—Marc E. Bookbinder
Attorney, Agent, or Firm—James E. Jacobson, Jr.; Edward M. Roney; Joseph T. Downey

[57] ABSTRACT

An adaptable homotropic antenna system for use with a portable communication transceiver is described. The antenna system can be used for reception or transmission and can be completely enclosed within the portable transceiver housing. The homotropic antenna system evaluates the quality of a received signal and if the signal is below a predetermined threshold level, an alternate antenna will be selected. The antenna system will continue to sample the available antennas until an antenna produces a signal of acceptable quality.

13 Claims, 5 Drawing Figures

HOMOTROPIC ANTENNA SYSTEM FOR PORTABLE RADIO

BACKGROUND OF THE INVENTION

1. Field of Invention

This invention relates to the field of portable communication transceivers and specifically to a portable transceiver antenna system which is adapted for electronically altering the antenna/receiver characteristics in response to changing environments in which the transceiver is utilized.

2. Description of the Prior Art

Portable radio transceivers are used in several facets of communications technology. Portable transceivers can be found in paging systems, two-way communication systems such as those used by police and other public servants, and more recently portable receivers have found use in portable data terminals which are used to communicate with a host computer over a radio link. Portable data terminals provide computer diagnostics and expanded computer power in the portable terminal.

Typical portable paging receivers in the past have incorporated loop-type antennas which are typically responsive to the magnetic field component of a transmitted RF signal. This type of antenna system provides marginal performance, but is desirable because the loop antenna can be concealed within a radio housing and responds well when the receiver is in close proximity to a human body. However, the overall sensitivity of the antenna/receiver combination is somewhat degraded where the receiver is not in close proximity to a human body. In addition, loop-type antennas exhibit certain problems which make them undesirable for use in a portable device which also utilizes a transmitter.

Portable units which contain both a receiver and transmitter are utilized in public service and private industry where communication between a number of units is desirable. The units typically contain a receiver and transmitter used in combination with an external helical, monopole or dipole antenna. These antennas are responsive to the electrical field of an RF signal and provide superior reception and transmission characteristics, when the antenna is located externally to the portable device housing. In addition, helical and monopole antenna performance is degraded substantially when the antenna is operated in close proximity to a human body.

A paging receiver is normally worn on the body when in use. Unlike the pager, a portable transceiver is utilized in many different environments. It may be handheld in front of the face, worn on the hip, or placed on a conducting or non-conducting surface.

With the advance of data processing and data communication techniques, it is now desirable to manufacture portable communication devices which are capable of transmitting and receiving data in cooperation with a host computer. These devices are for instance useful to servicemen who use the portable terminal to perform on-site computer testing and diagnostics, and to keep records thereof. It is desirable to manufacture a portable data terminal as small as possible, so the terminal can be transported easily. In addition, it is also desirable to provide a portable data terminal with an antenna system which is completely enclosed within the terminal housing. This feature enhances the portability of the data terminal, as well as providing protection for the terminal antenna system.

These terminals may be carried in the hand, worn on the hip, put in a coat pocket, used on a desk, or put into a service tool kit. The orientation of the unit, as well as its physical environment is constantly changing as it is utilized from one time to the next.

Since the portable data terminal is operated in a number of distinct environments and orientations, it is necessary to provide an antenna system which is adaptable to a changing environment. Adaptability is especially useful when the portable data terminal is used in close proximity to a human body.

Adaptable antenna systems exist in the prior art but have primarily focused on antenna systems which are used in mobile or fixed communications systems. These systems are typically implemented in an automobile-based environment and utilize two identical antennas which are placed so as to be more than a quarter wavelength from each other. When the antenna system passes through a changing environment such as an automobile passing a building, one antenna may encounter a null or a point in space where the Rf energy is low due to multipath interference, and the radio receiver will select the alternate antenna.

These adaptable antenna systems are known as mobile diversity systems, and operate on a principle which provides that if a null occurs at a point in space, the likelihood of a null occurring at a point some distance away from the null, typically one quarter wavelength, is low. Simply stated, if one antenna in the mobile diversity system is in a null, the other antenna is probably not in a null.

Furthermore, mobile diversity systems typically utilize identical antennas which are oriented in the same plane and exhibit identical reception characteristics. The antennas in a mobile diversity system are located externally to the vehicle and typically utilize monopole, dipole, or helical antennas.

This type of antenna system is designed to operate in a free-space environment where the electromagnetic waves exhibit 377 ohms impedance, and the immediate physical surrounding of the antennas do not change. It would not particularly be advantageous on a portable tranceiver when the the environment changes, for example being in close proximity to the human body.

Adaptable antenna systems have not been developed for portable communication devices in part due to conventional teachings which indicate that a diversity type antenna system requires antennas which are placed at least one quarter wavelength apart, which is usually not possible in a portable communication device. In addition, it has been neither practical nor desirable to place a plurality of monopole type antennas external to a radio housing due to space limitations and aesthetics.

Portable radio's are typically provided with monopole antennas which are necessarily larger than a radio housing because of the range of operating frequencies of the unit. This is especially true for radio's which transmit as well as receive. A radio housing limits the placement as well as the size of the antenna, whether the antenna is disposed internal or external to the housing. Finally, relatively minor alterations to the radio housing can cause drastic changes in the operating characteristics of the radio unit. The most advanced radios of today may be provided with a single enclosed antenna and the enclosed antennas of today are not capable of the transmitting an RF signal. Techniques have not previously been developed which provide for the placement of an efficient multi-antenna system within a radio housing.

For the foregoing and other shortcomings, there is a need for an improved adaptable antenna system for use with a portable transceiver in which the antenna system can be used to transmit or reliably receive a signal subject to deep fades while at the same time being contained completely within the radio housing.

The present invention overcomes the foregoing problems in a portable receiver by incorporating a plurality of antennas within a radio housing, they may or may not be disposed a quarter wavelength apart from each other, and by relying on antenna characteristics and placement they provide a diverse antenna selection within the system. In particular, they are designed each one to respond best in a different type of physical environment. They designed and placed so as to minimize the probability of all being degraded simultaneously during typical use of the portable receiver.

SUMMARY OF INVENTION

Accordingly, it is an object of the present invention to provide an improved antenna system which can be incorporated into a portable transceiver and which provides optimum reception in a changing environment.

It is a further object of the present invention to provide an adaptable antenna system which can be completely enclosed in a portable radio housing.

It is another object of the present invention to provide a portable radio antenna system which maintains maximum receiver sensitivity while in close proximity to a human body as well away from a human body.

It is yet another object of the present invention to provide a portable radio antenna system which maintains good receiver sensitivity in a plurality of any other environments in which the portable is expected to be utilized.

It is yet another object of the present invention to optimize antenna/receiver sensitivity as the orientation of the portable unit is changed.

Briefly described, the invention contemplates an antenna system in which a plurality of antennas are incorporated within the housing of a portable transceiver. Each antenna incorporated within this system is designed to exhibit distinct reception characteristics, or in the alternative to be located in a dissimilar orientation with respect to the other antennas used in the system. The receiver determines the relative sensitivity of each antenna in a specific environment and connects the radio receiver to an antenna which has optimum reception characteristics.

One embodiment of the present invention provides two antennas which are similar in structure and in a perpendicular relation to each other. This antenna arrangement provides two antennas in which the electric field vectors of the antenna reception patterns are oriented in different directions.

When the portable is utilized in an area relatively free from multipath signal reflections, the arriving signal from the distant radio transmitter will be predominantly linearly polarized, with the E field vector vertically oriented if the transmitting antenna was vertically polarized. In order to maximize reception, a receiving antenna should match the polarization direction, i.e., vertical. A horizontal receiving antenna would receive little or no signal power. Therefore, one of the two portable antennas is oriented for receiving vertical polarization while the unit is handheld or utilized in an upright position while the other antenna is oriented to receive vertical polarization while the unit is lying flat, for example, on a desk.

Another embodiment incorporates two internal antennas of any structure which are physically separated from each other, for example at opposite ends of the unit. The locations are chosen such that the liklihood of both antennas being degraded simultaneously by some user action is minimal. For example, a portable data terminal may be hand-held, with the hand enclosing one of the two internal antennas and degrading its performance. The other antenna will then not likely be covered, and will perform properly. Depending upon whether the person is right-handed or left-handed, and depending upon how he grasps the unit, the situation may reverse itself.

Another embodiment of the present invention incorporates antenna structures which are dissimilar and which provide distinct reception characteristics. One antenna is a dipole exterior to the unit, which performs well when the unit is handheld somewhat away from the body. The other antenna is a loop antenna which is tuned to perform well when the unit is worn on the belt. The receiver will select the antenna which provides the better signal as the unit is shifted from one position to the other during use.

DETAILED DESCRIPTION OF THE PREFERRED EMBODIMENT

Figure 1:
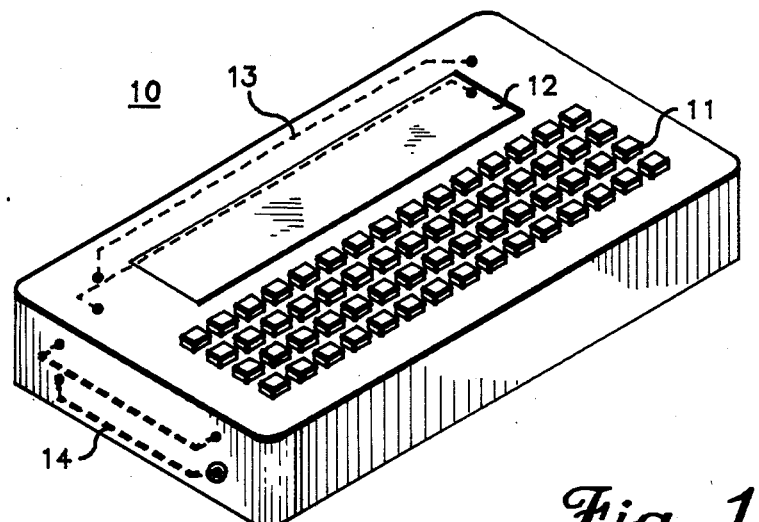
FIG. 1 is a perspective drawing of a portable data receiver such as one which would incorporate the preferred embodiment of the present invention.

FIG. 1 shows a perspective drawing of a portable transceiver 10 such as one which would be used with the present invention. The portable transceiver 10 incorporates a display 12 and keyboard 11 and is used to communicate with a host computer. The portable tranceiver 10 transmits and receives data and can be used to provide on-site computer diagnostics. The portable transceiver 10 is constructed of a plastic housing which encases the terminal and radio electronic circuits, as well as an improved homotropic antenna system including a plurality of antennas 13, 14 which are disposed in different orientations. These antennas 13, 14 may also exhibit distinct reception characteristics, and one of the antennas may be exterior to portable transceiver 10 although both are preferably inside the plastic housing thereof. Two antennas which may be incorporated in the improved homotropic antenna system are described in pending patent applications Ser. Nos. 489,893 now U.S. Pat. No. 4,516,127 and 489,894 now U.S. Pat. No. 4,494,120 and entitled "Three Element Low Profile Antenna" by Kazimierz Siwiak and "Two Element Low Profile Wire Antenna" by Oscar M. Garay, respectively, and filed Apr. 29, 1983. These inventions are assigned to the Assignee of the present invention.

The antennas described in these patent application provide reception characteristics in which the electric field and magnetic field vectors are oriented in a different manner in the respective antennas. When these antennas are placed in perpendicular relation to each other, such as antennas 13 and 14 in FIG. 1, the antenna system will provide a reception pattern in which the electric and magnetic field vectors of the respective antennas are orthogonal with respect to each other. Therefore, an essential feature of the antennas in the homotropic antenna system is that the reception characteristic of each antenna be sufficiently uncorrelated such that an environmental condition which adversly affects one antenna, will not affect the alternate antenna in the same way.

Figure 2:
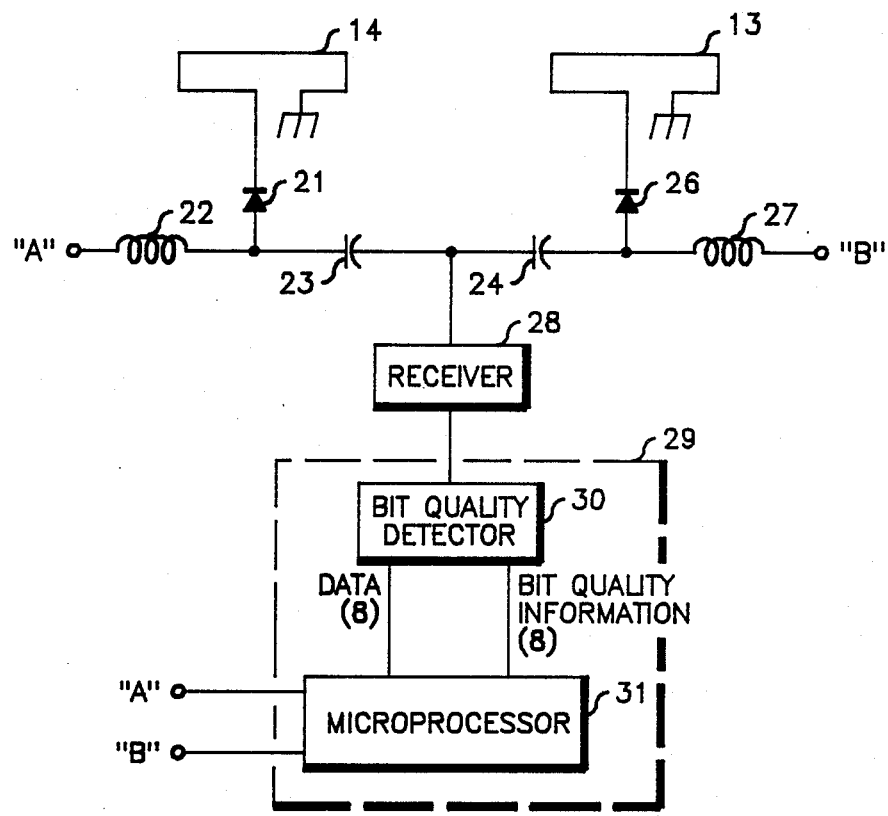
FIG. 2 is an electrical schematic of a first embodiment of the present invention.

FIG. 2 shows a detailed electrical schematic of a first embodiment of the present invention. The invention contemplates a receiver 28 used in combination with a plurality of antennas 13 and 14, which are selected according to the signal quality from each antenna. A first antenna 14 is coupled to PIN diode 21. The PIN diode is also coupled to an inductor 22 and a capacitor 23. A second antenna 13 is coupled to a PIN diode 26 which is coupled to a capacitor 24 and an inductor 27. The junction of capacitors 23 and 24 is connected to the receiver 28.

In operation, an antenna is activated by placing a bias voltage at point A or B. This bias voltage places PIN diode 26 or 21 in the conductive state which provides a connection from antenna 13 or 14 to the receiver 28 through capacitor 24 or 23.

The receiver 28 converts the received RF signal to a lower frequency signal which is then coupled to a bit quality detector 30. The bit quality detector 30 provides an output related to the signal/quality of the output signal of the receiver 28. The receiver 28 processes the received signal and converts it to a lower frequency signal of the desired form, in this case binary data at approximately 4800 bits/sec. The receiver data output is then coupled to a bit quality detector 30 which generates a binary signal corresponding to the binary data signal which provides a flag indicating the quality of a received bit. The bit quality detector 30 is coupled to a microprocessor 31 which processes the incoming data and bit quality information in accordance with the present invention. The microprocessor then selectively activates antenna 13 or 14 depending on the quality of the incoming signal being produced by a particular antenna.

Figure 6:
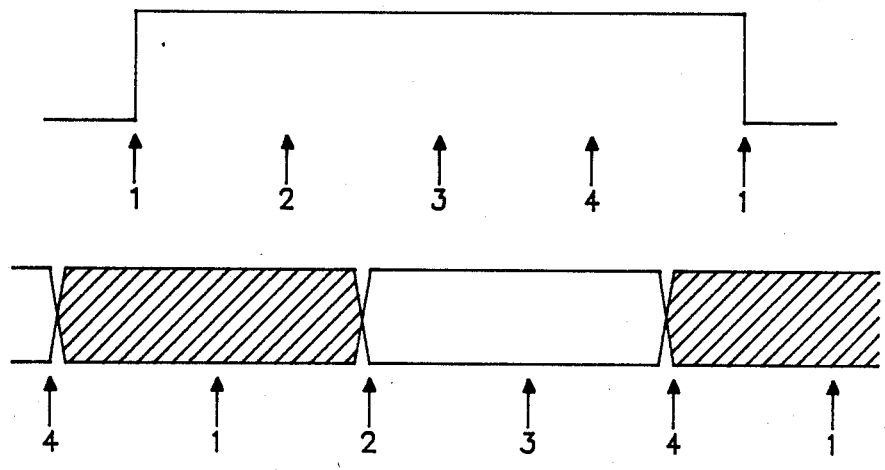

FIG. 6 is an illustration of the sampling scheme for determining bit quality in accordance with the present invention. As shown in FIG. 6, each incoming data bit is sampled four times. According to the present invention, a data bit of acceptable integrity is defined as having less than $\pm\frac{1}{4}$ bit transition time jitter. Therefore, according to FIG. 6, if samples 2, 3 and 4 are the same, i.e., all ones or zeros, then the noise flag will be set to zero for that bit, otherwise, the noise flag is 1.

Figure 7:
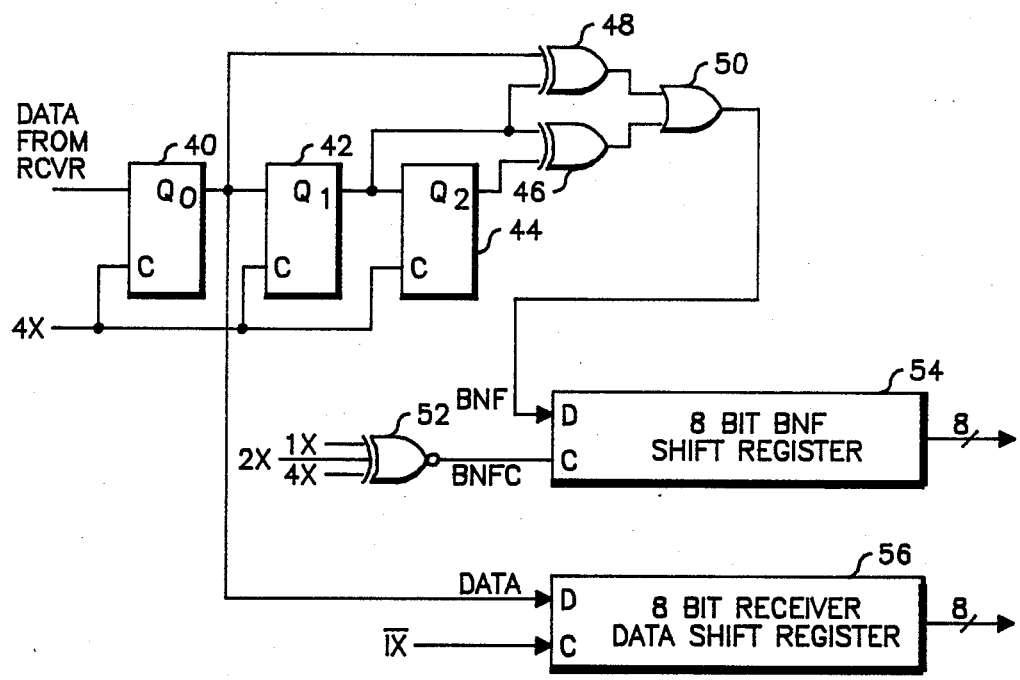

FIG. 7 shows an electrical schematic of a circuit in bit quality detector 30 in FIG. 2 which generates noise flag bit information in accordance with the present invention. The bit noise flag generator circuit consists of a series of flip-flops 40, 42, 44 which are configured as a 3 bit shift register. Samples are shifted into the three bit shift register at four times the data rate as shown by terminal 4X coupled to flip-flops 40, 42 and 44. The three outputs of this shift register provide the four sample per bit information required to recover clock and data and generate bit noise flags.

A separate circuit (not shown) decodes the data stream and produces a clock signal at the clock rate, a clock signal at twice the data rate and a clock signal at four times the data rate. The clock recovery circuit could be any conventional digital phase locked loop configured to lock the detector clock onto the incoming data stream. The four samples occur on the rising edge of 4X serial data clock. The 1X and 2X clocks are derived from the 4X clock by simple divide by 2 stages. The 1X and 2X clocks are used to uniquely identify the position of the four samples as they are shifted through the 3 bit register.

The recovered data signal is derived from the output of flip-flop 40 and corresponds to sample 3 of FIG. 6. The data sample is then shifted to the 8 bit data register 56 on each falling edge of the 1X clock. The bit noise flag information is generated by logic gates 46, 48 and 50. The bit noise flag bit is shifted into the 8 bit BNF register 54 on the rising edge of the BNF Clock (BNFC). This occurs when flip-flop 40 stores sample 4, flip-flop 42 stores sample 3, and flip-flop 44 stores sample 2. The exclusive OR gates 48, 46 and OR gate 50 are coupled so that they generate an output according to the logical relationship.

$$BNF=[2(XOr)3]+[3(XOr)4]$$

After eight data bits and the corresponding BNF bits have been shifted into the registers 54, 56, the information is transferred to buffer registers (not shown) which are accessed by the microprocesor 31 of FIG. 2.

Figure 8:
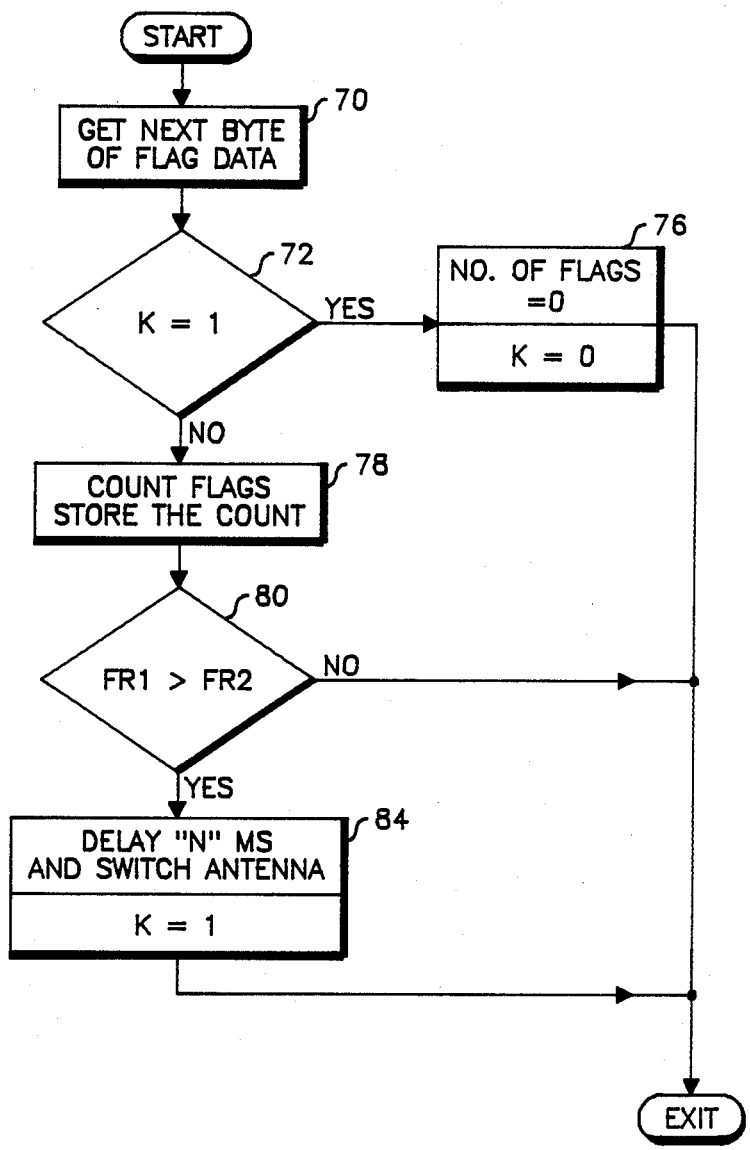

FIG. 8 shows a flow diagram which defines the microprocessor (31 of FIG. 2) operation in accordance with the present invention. The process of the present invention keeps a running total of how many bits are flagged and which antenna is connected when each byte's worth of data received. The inventive process decides that the antenna is to be switched if and only if there is at least one flag bit that is a 1 in the most recently received byte and the flag rate from the non-attached antenna (FR2) is less than the flag rate of the attached antenna (FR1). Flag rate 2 (FR2) is defined as the number of flags received in the last fourteen bytes when the non-attached antenna 2 was attached divided by the number of bytes when the non-attached antenna was attached. FR2 is equal to zero if non-attached antenna was not attached during the last 14 bytes. Flag rate 1 (FR1) for the attached antenna FR1 is defined in the same manner.

When an antenna switch is effected, the number of flags in the byte where the antenna switch occurred is set to zero and the associated byte is considered to belong to the antenna that was switched in. The inventive process also causes the switching action to occur at a particular time before the next bit enters the antenna terminals. For the purposes of the preferred embodiment the microprocessor (31 in FIG. 2) is adjusted to switch the antenna about 50 microseconds before the bit transition enters the antenna terminals. This feature allows the antenna system to switch antennas at a time which minimizes bit errors due to switching transients.

In accordance with the present invention, the program shown in FIG. 8 is initiated every time the BNF and data registers (54, 56 in FIG. 4) have accumulated eight bits. Item 70 instructs the microprocessor to read the contents of the data and BNF registers into the microprocessor RAM. For the purposes of the present invention, 14 bytes of previous BNF information for the antennas are also retained in RAM. Decision 72 examines the byte count K for the currently activated antenna. If the byte count K indicates that an antenna switch occurred during the last BNF byte (i.e., K=1), decision 72 directs the program to item 76 which sets the BNF count to zero because this byte has been corrupted by the antenna switching transient. The byte count K is then reset and item 76 exits the routine to wait for the next byte.

If an antenna switch did not occur during the last BNF byte (i.e., K=0), decision 72 selects item 78 which counts and stores the BNF information of the latest byte. The proram proceeds to decision 80 which compares the relative flag rates FR1 and FR2 of the two antennas. The flag rate FR of a particular antenna is defined according to the following relationship.

FR(n)=number of flag bits from antenna/number of antenna bytes antenna(n)

Flag rate 2 (FR2) is always associated with the detached antenna. If flag rate 1 (FR1) is greater than the flag rate from the detached antenna FR2, the program proceeds to item 84 which waits approximately 50 microseconds before the next bit enters the receiver and then switches antennas. Item 84 then resets the byte counts to 1 and exits the routine.

If flag rate 1 (FR1) is less than or equal to flag rate 2 (FR2), an antenna switch is not required and decision 80 exits the routine.

According to an important feature of the present invention, the signal is processed by the receiver 28 and bit quality detector 30, and the microprocesser 31 makes a decision based on the quality of the received signal. If the signal quality is below a predetermined threshold level, the microprocessor 31 will select the alternate antenna. If the alternate antenna also produces an output signal of an unacceptable quality, the microprocessor 31 will alternately select antennas until one antenna produces a signal of acceptable level. A particular antenna will remain selected until the signal deteriorates to an unacceptable quality.

Figure 3:
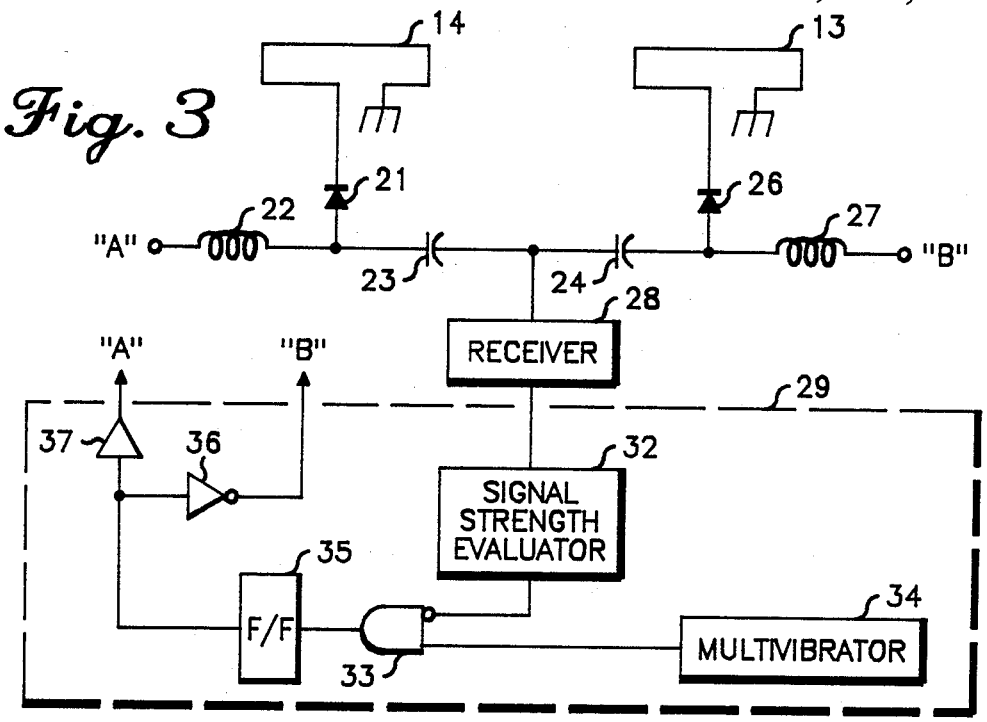
FIG. 3 is an electrical schematic showing a second embodiment of the present invention.

FIG. 3 shows a detailed electrical schematic of a second embodiment of the present invention. The invention contemplates a receiver 28 used in combination with a plurality of antennas 13 and 14, which are selected according to the signal strength from each antenna. A first antenna 14 is coupled to PIN diode 21. The PIN diode is also coupled to an inductor 22 and a capacitor 23. A second antenna 13 is coupled to a PIN diode 26 which is coupled to a capacitor 24 and an inductor 27. The junction of capacitors 23 and 24 is connected to the receiver 28.

In operation, an antenna is activated by placing a bias voltage at point A or B. This bias voltage places PIN diode 26 or 21 in the conductive state which provides a connection from antenna 13 or 14 to the receiver 28 through capacitor 24 or 23.

The receiver 28 converts the received RF signal to a lower frequency signal which is then coupled to a signal strength evaluator circuit 32. The signal strength evaluator circuit 32 provides an output related to the signal strength of the output signal of the receiver 28. The signal strength evaluator circuit 32 produces a two-state binary output. If the signal-to-noise ratio of the receiver output signal is below a predetermined threshold level, the output of the evaluator circuit 32 will remain low or the equivalent of a logic "0."

Conversely, if the signal-to-noise ratio of the receiver output signal rises above a predetermined level, the output of the evaluator 32 will remain high or the equivalent of a logic "1."

The signal strength evaluator circuit 32 is then coupled to an AND gate 33. The AND gate 30 also receives an input from the multivibrator 34. The multivibrator 34 produces a continuous stream of logical ones and zeros or the equivalent of a squarewave signal at a predetermined frequency of operation.

If the output of the signal strength evaluator 32 produces a logic zero output, the output of the multivibrator will be coupled to flip-flop 55 through the AND gate 33. When the flip-flop 35 receives the signal from the multivibrator 34, the flip-flop 35 changes state and reverses the output from the previous pulse period.

The output of the flip-flop 35 is coupled to a terminal "A" by buffer 37 and to a terminal "B" by an inverter 36. The output of inverter 36 is coupled to a terminal "B". Terminals A and B provide a bias voltage for the control of the PIN diode antenna switches 21 and 26. Therefore, a signal is received by either antenna 14 or 13 depending upon the signal strength of incoming signal at the respective antennas. According to an important feature of the present invention, the signal is processed by the receiver 28, and the signal strength evaluator 32 make a decision based on the quality of the received signal. If the signal is below a predetermined threshold level, the system will select the alternate antenna. If the alternate antenna also produces an output signal of an unacceptable level, the antenna system will toggle between antennas until one antenna produces a signal of acceptable level. A particular antenna will remain selected until the signal deteriorates to an unacceptable level.

Figure 4:
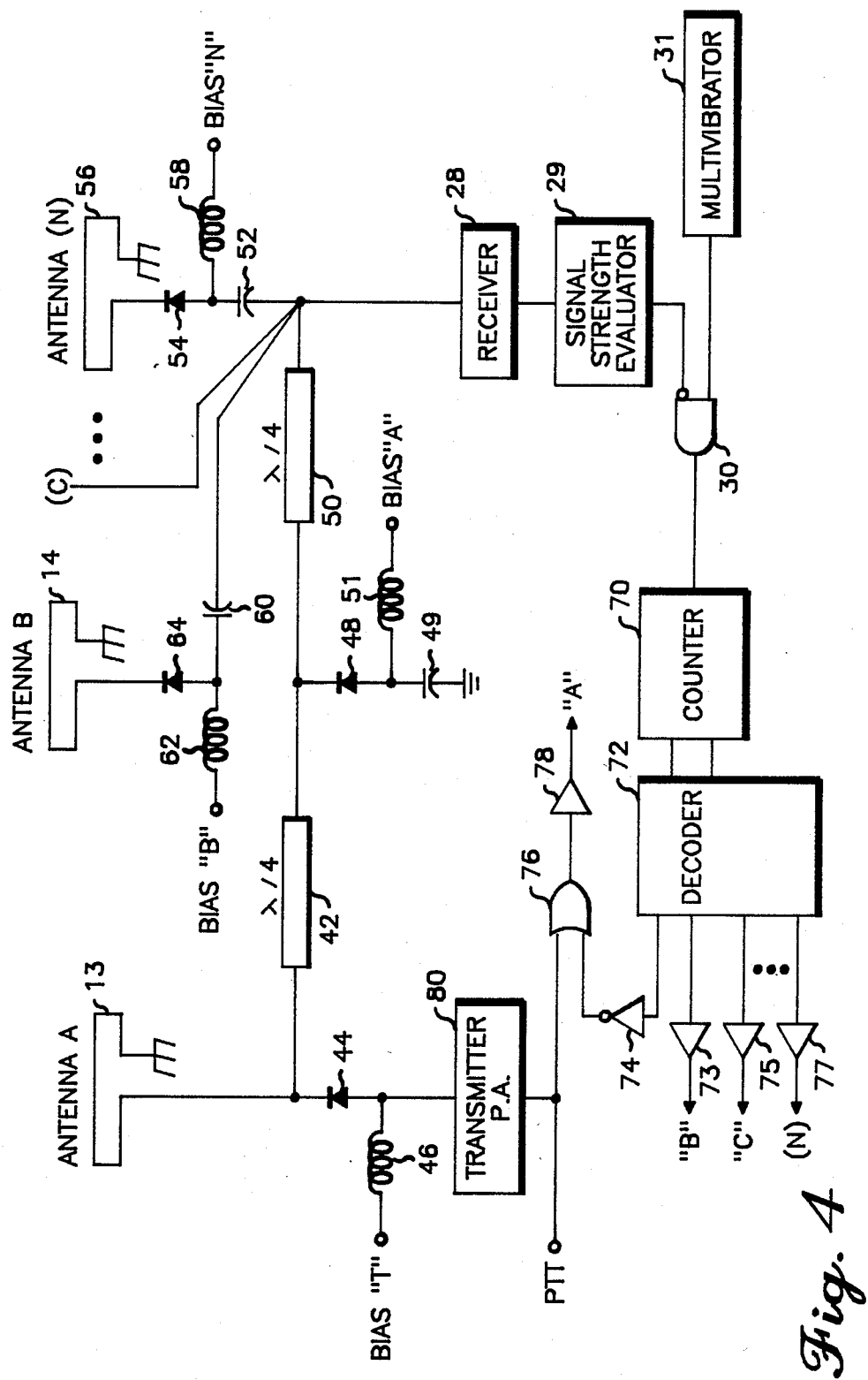
FIG. 4 is an electrical schematic showing a third embodiment of the present invention.

FIG. 4 shows a third embodiment of the present invention. The third embodiment contemplates an adaptive antenna system which can be used with a transmitter as well as providing two or more antennas which can be used to receive RF signals.

The expanded homotropic antenna system in FIG. 4 includes an antenna 13 which is connected to an electrical resonant element 42. The antenna 13 is also coupled to a PIN diode 44. The PIN diode 44 is coupled to an inductor 46. The PIN diode 44 and the inductor 46 are coupled to a transmitter power amplifier 80 which can be a conventional power amplifier such as that shown in U.S. Pat. No. 4,367,443. The inductor 46 is also coupled to a terminal T. The resonant element 42 is connected to a pin diode 48 which is in turn, connected to a capacitor 49. The resonant element 42 and pin diode 48 are also connected to second resonant element 50.

The second resonant element 50 is connected to a capacitor 60 which is connected to a pin diode 64 and an inductor 62. The pin diode 64 is connected to a second antenna 14.

In operation, a control signal is applied to point A and point B. If a voltage is present at node A and B, the pin diode 48 will be forward biased and the junction between the first resonant element 42 and the second resonant element 50 will be electrically grounded. Any signal appearing at antenna 13 will be isolated from antenna 14.

In addition, a control voltage is applied to point B which forward biases pin diode 64. Antenna 14 is then connected to a receiver 28 through diode 64 and capacitor 60 while being isolated from antenna 13.

Conversely, if no control signal is present, at A or B, diode 64 will be in a non-conductive state, thereby isolating antenna 14 from the radio receiver. In addition, since there is no control signal applied to diode 48, the first and second resonant elements provide an electrical connection from antenna 13 to the receiver 28.

Similarly, any number of receive antennas can be added to the homotropic antenna system as shown at terminal "C" by utilizing identical circuitry shown with antennas 14 or 56. For example, another antenna 56 can be added by coupling the antenna with an inductor 58, a PIN diode 54 and a capacitor 52. The antenna 56 can be selected by applying a bias voltage at terminal Bias "A" and Bias "N".

As previously noted, antennas 13 and 14 are selectively connected to the receiver 28 in response to control signals applied to point A and B. The receiver 28 provides an output which would be connected to a radio discriminator and also provides a separate connection to a signal strength evaluator 29. The signal strength evaluator circuit provides a dual state output relative to the signal quality of the signal generated at the output of receiver 28. The signal strength evaluator circuit 29 can be any squelch type circuit adapted to provide a binary output. A suitable squelch circuit is described in Motorola Instruction Manual No. 68P81023E30 entitled "Rural Telephone System" and dated 1975. This instruction manual is available from the Service Publications Department of Motorola Inc., 1301 East Algonquin Road, Schaumburg, Ill. or from Motorola C & E Parts, 1313 East Algonquin Road, Schaumburg, Ill. If the signal strength of the receiver output signal is below a predetermined level, the signal strength evaluator 29 will produce an output signal equivalent to a logical "0." Conversely, if the signal-to-noise ratio of the receiver output signal is of acceptable quality, the output of the signal strength evaluator will remain the equivalent of a logical "1." The signal strength evaluator circuit is of the type previously described for FIG. 2.

The output of signal strength evaluator 29 is connected to an AND gate 30. The AND gate 30 also receives an input from multivibrator 31. The multivibrator produces a continuous output signal comprising a progression of logical ones and zeros. Therefore, if the output of the signal strength evaluator produces a logic zero output, the output of the multivibrator will be coupled to an electronic counter 70. The counter 70 is a standard "off the shelf" binary counter which can be programmed to begin counting at any binary number. When coupled to a binary decoder 72, the decoder will selectively activate the buffer circuitry associated with terminals A, B, C or N or any number of outputs in sequence. As control signals A, B, C, or N are activated, antennas 13, 14 and 56 will be selectively connected to receiver 28. When one antenna produces a signal of acceptable quality, the scanning sequence ceases and the system remains on that antenna until the signal drops below an acceptable level.

If the homotropic antenna system in FIG. 3 is to be used to transmit a signal, the antenna system is configured to utilize a single antenna for transmission and provide isolation between the antenna being used for transmission and the receiver.

To initiate a transmission, the user of the portable transceiver first activates the PTT terminal shown in FIG. 4. The PTT may be coupled to the output of a switch which is on the keyboard of the transceiver or may be controlled automatically by other circuity in the transceiver. At the same time, a bias voltage is applied to terminal T of inductor 46. The bias voltage T is present only during transmission. The bias signal applied at terminal T is supplied by a buffer (not shown) which is also activated by the PTT signal. The PTT signal is applied to a transmitter power amplifier 80 and an OR gate 76. The output of OR gate provides the control voltage to the "A" terminal of inductor 51 which switches diode 48 into the active state, which provides an AC ground at the junction of resonant elements 42 and 50. Therefore, any RF energy at antenna 13 will be isolated from receiver 28. The bias signal applied to terminal T activates diode 44, thus providing a continuous path between antenna 13 and transmitter power amplifier 80.

Figure 5:
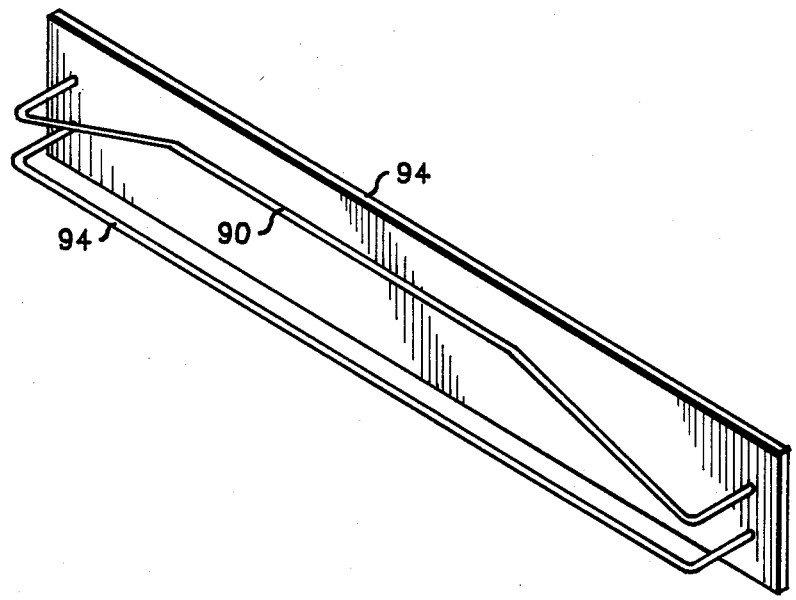
FIG. 5 is a diagram of an antenna structure that may be utilized in the antenna system of the present invention.

FIG. 5 is a diagram of an antenna structure that may be utilized in the antenna system of the present invention. This antenna may be substantially the same as the antennas 13 and 14 shown in FIG. 1. The antenna consists of two elements 90 and 92 which are disposed on the radio chassis 94 which is contained within a radio housing. The first antenna element 90 is a driven element which is grounded at one end and connected to the antenna system at the opposite end. A second antenna element 92 is grounded at each end and is located approximately 3 centimeters from the first antenna element for an operating frequency range of 800 MHz to 850 MHz. The second antenna element acts as a reflective element with respect to the first element. This antenna provides a signal reception pattern in which an electric field is excited between the radiators as well as between the radiators and the groundplane provided by chassis 94. In addition this antenna structure provides acceptable performance when operated in close proximity to a human body. Further details of this antenna structure are described in the aforementioned pending patent application, Ser. No. 489,894 now U.S. Pat. No. 4,494,120.

The antenna shown in FIG. 5 can be adapted to provide superior performance when the unit is hand held by placing at least one antenna in a position which is not likely to be covered by a hand. In addition this antenna can be tuned to provide superior open air or on the body reception.

Another antenna which could be successfully utilized in the present invention are disclosed in U.S. Pat. No. 4,313,119 entitled "Dual Mode Transceiver Antenna" 1982 by Garay et. al. and assigned to the assignee of the present invention. Yet another antenna which could be utilized with the present invention is disclosed in U.S. Pat. No. 3,736,591 entitled "Receiving Antenna for Miniature Radio Receiver" by Rennels et al and assigned to the assignee of the present invention. Either one of these antennas can be used in place of antennas 13, 14 in FIG. 1 and may be external or internal to the housing of portable transceiver 10.

In summary a homotropic antenna system capable of providing transmission and adaptable reception characteristic has been described and provides an adaptable antenna system which is preferably completely disposed within a portable transceiver housing. The antenna system is capable of transmitting or receiving a signal and automatically selects a particular antenna based on the signal quality at each respective antenna. This has been intended as an illustration of the principles of the present invention. Accordingly, other modifications, uses and embodiments will be apparent to one skilled in the art without departing from the spirit and scope of the principles of the present invention.

What is claimed is:

1. A homotropic antenna system for use in a portable receiver having a non-conductive housing which encloses the antenna system comprising:
   a first antenna means optimized for reception in free space;
   a second multiwire antenna means optimized for reception in close proximity to a human body;
   receiver means having an output for receiving an RF signal;
   a plurality of electronic switch means, each coupled between a corresponding antenna means and said receiver means for selective actuation of corresponding antenna means in response to a control signal;
   a signal evaluation means coupled to the output of said receiver means for providing an output signal indicating the relative signal quality of the output signal of said receiver means; and
   control circuit means coupled to the output of said signal evaluation means for generating a control signal in response to the output signal of said signal evaluation means, said control circuit alternately activating said first or second antenna means if the presently connected antenna means produces a signal of unacceptable quality.

2. An improved homotropic antenna system for use in a portable receiver having a non-conductive housing which encloses the antenna system comprising:
   first and second antenna means being disposed to provide uncorrelated reception, wherein said first antenna means is optimized for reception in close proximity to a human body and said second antenna means is optimized for reception in free space;
   first and second electronic switch means coupled to said first and second antenna means, respectively for actuating said first or second antenna means in response to one of a pair of control signals;
   receiver means having an output for receiving an RF signal;
   first and second coupling circuits each coupled between said first and second electronic switch means, and said receiver respectively, for providing means coupling between said first and second antenna means and said first and second electronic switch means and said receiver means;
   a signal quality evaluator coupled to said receiver means for providing an output signal having a first and second state based one the signal strength of the output of said receiver means; and
   a control circuit for providing said pair of control signals in response to the output signal of said signal quality evaluator, said control circuit coupled to said first and second electronic switch means and activating an alternate antenna in the system if said output signal is in said first state and keeping said first or second antenna activated if said output signal remains in said second state.

3. An improved homotropic antenna system fo use in a portable receiver having a non-conductive housing which encloses the antenna system comprising:
   first and second antenna means for receiving a transmitted R.F. signal, wherein said first and second antenna means are optimized for operation in different electromagnetic environments;
   first and second electronic switch means coupled to said first antenna means and said second antenna means respectively for actuating said first of second antenna response to a first of second control signal respectively;
   receiver means having an output for receiving an RF signal;
   first coupling means coupled to said second electronic switch means and to said receiver means for providing coupling between said second antenna means and said receiver means;
   signal strength evaluation means coupled to said receiver means for providing an output signal indicating the quality of the output signal of said receiver means;
   a control circuit means coupled to said signal quality evaluator means and to said first and second electronic switch means for alternately selecting the first antenna means or second antenna means if said output signal is in said first state and keeping an antenna activated if said output signal remains in said second state.

4. The system of claim 3 wherein said first and second electronic switch means includes a PIN diode and an inductor.

5. The system of claim 3 wherein said signal quality evaluation means is a squelch type circuit.

6. The system of claim 3 wherein at least one antenna means is a multiwire antenna having first and second elements spaced at a predetermined distance from each other.

7. An improved homotropic antenna system, having a plurality of selectable antennas, for use in a portable FM transceiver having a transmitter and a receiver and a non-conductive housing which completely encloses the antennas, said system comprising:
   receiver means, having an output, for receiving an RF signal;
   first antenna means for receiving or transmitting an RF signal;
   a plurality of selectable alternate antenna means with each of said respective antenna means or exhibitive of distinct reception characteristics, said antenna means adapted primarily for receiving a RF signal wherein at least one of said selectable antennas is optimized for reception in close proximity to a human body or similar relatively conductive object;
   first electronic switch means coupled to said first antenna means for selectively coupling said antenna means to said receiver in response to a control means;
   transmitter means coupled to said electronic switch means having a user actuated input terminal for activating said transmitter and an output providing a modulated carrier signal for transmission;
   first resonant element means coupled between said first electronic switch means and said first antenna means for providing coupling and isolation between said transmitter and first antenna and the receiver and the alternate selectable antennas of the antenna system;
   second electronic switch means coupled to the first resonant element means for selectively applying a AC ground to one terminal of said first resonant element means;

a second resonant element means coupled to said first resonant element means and said second electronic switch means for providing coupling or isolation between said first antenna means and the alternate selectable antennas of the homotropic antenna system;

a plurality of electronic switch means coupled between each of said respective alternate selectable antenna means and said receiver means for activating each respective alternate selectable antenna means in response to a plurality of control signals;

signal quality evaluator means coupled to the output of said receiver means for providing an output indicating the signal quality at the output of said receiver means; and a control circuit means coupled to said signal quality evaluator means and said user actuated input of said transmitter means for providing a plurality of control signals in response to the output of said signal quality evaluator means, said control circuit coupled to said electronic switch means for alternately activating an antenna for reception or isolating the receiver means when the antenna system is used for transmission as indicated by said user activated transmitter input.

8. The system of claim 7 wherein each of said electronic switch means includes a PIN diode and an inductor.

9. The system of claim 7 wherein said signal quality evaluator means is a squelch type circuit to provide a two state output.

10. The system of claim 7 wherein said resonant elements comprise microstrip elements configured to be one quarter wavelength of a desired antenna operating frequency.

11. The system of claim 7 wherein at least one antenna means is a multiwire antenna having first and second elements spaced at a predetermined distance from each other.

12. A homotropic antenna system for use in a portable receiver having a non-conductive housing, wherein said antenna system provides at least one activated antenna at all times, said system comprising:

a plurality of antenna means disposed substantially within said housing, each of said respective antenna means being disposed to provide reception characteristics which are optimized for different electromagnetic environments, wherein at least one of said electromagnetic environments is in close proximity to a relative conductive object, and at least one antenna means having a portion external to said housing;

a receiver means for converting an RF signal to an IF signal;

a plurality of electronic switch means, each coupled between a corresponding antenna means and said receiver means for actuating said corresponding antenna means in response to a particular control signal;

a signal evaluation means coupled to said receiver means for providing an output signal having a first and second state based on signal quality of the output signal of said receiver means; and control circuit means for providing a plurality of control signals in response to the output signal of said signal evaluation means, said control circuit means activating an alternate antenna means if the presently activated antenna means produces a signal of unacceptable quality.

13. A homotropic antenna system for use in a portable FM receiver having a non-metallic housing which encloses the antenna system, comprising:

a plurality of FM antenna means, each of said respective antenna means being optimized for different electromagnetic environments, wherein at least one of said electromagnetic environments is in close proximity to a relative conductive object;

FM receiver means having an output for receiving an RF FM signal;

a plurality of electronic switch means, each coupled between a corresponding antenna means and said receiver means for actuating said corresponding antenna means in response to a particular control signal;

a signal evaluation means coupled to said FM receiver means for providing an output signal having a first and second states based on signal quality of the output signal of said receiver means; and control circuit means for providing a plurality of control signals in response to the output signal of said signal evaluation means, said control circuit means coupled to said electronic switch means and activating an alternate antenna means if the presently activated antenna means produces a signal of unacceptable quality.

* * * * *